US012416255B2

(12) United States Patent
Zhu

(10) Patent No.: US 12,416,255 B2
(45) Date of Patent: Sep. 16, 2025

(54) UREA TANK AND FUEL TANK ASSEMBLY

(71) Applicant: Tongya (Shandong) Automobile Technology Group Co., Ltd., Jinan (CN)

(72) Inventor: Qingkai Zhu, Jinan (CN)

(73) Assignee: Tongya (Shandong) Automobile Technology Group Co., Ltd., Jinan (CN)

( * ) Notice: Subject to any disclaimer, the term of this patent is extended or adjusted under 35 U.S.C. 154(b) by 0 days.

(21) Appl. No.: 17/759,823

(22) PCT Filed: Aug. 6, 2021

(86) PCT No.: PCT/CN2021/111083
§ 371 (c)(1),
(2) Date: Jul. 29, 2022

(87) PCT Pub. No.: WO2023/272878
PCT Pub. Date: Jan. 5, 2023

(65) Prior Publication Data
US 2024/0183302 A1    Jun. 6, 2024

(30) Foreign Application Priority Data

Jun. 30, 2021 (CN) .......................... 202110740098.4

(51) Int. Cl.
*F01N 3/28* (2006.01)
*B60K 15/03* (2006.01)
(Continued)

(52) U.S. Cl.
CPC ......... *F01N 3/2882* (2013.01); *F01N 3/2066* (2013.01); *F01N 13/1861* (2013.01);
(Continued)

(58) Field of Classification Search
CPC ...... B60K 15/03; B60K 15/077; B60K 15/04; B60K 2015/0346; B60K 15/03177;
(Continued)

(56) References Cited

U.S. PATENT DOCUMENTS 5,398,839 A * 3/1995 Kleyn .............. B60K 15/03177
220/555
5,787,920 A    8/1998 Krasnov
(Continued)

FOREIGN PATENT DOCUMENTS

CN          1064055 A    9/1992
CN       201922925 U    8/2011
(Continued)

OTHER PUBLICATIONS

English Machine Translation of CN-110329060-A (Year: 2019).*
(Continued)

*Primary Examiner* — Don M Anderson
*Assistant Examiner* — Laura E. Parker
(74) *Attorney, Agent, or Firm* — Getech Law LLC; Jun Ye

(57) ABSTRACT

Disclosed is a urea tank and fuel tank assembly, which belongs to the field of automobile parts. The urea tank and fuel tank assembly includes a shell, wherein the shell includes an upper shell, a middle shell and a lower shell, the upper shell, the middle shell and the lower shell are welded separately to form a cavity including a fuel cavity. The urea tank and fuel tank assembly is welded after injection molding, so that not only is the shell uniform in wall thickness and high in mechanical strength, but also the welding stress is dispersed to the upper and lower ends of the shell by setting that the upper shell, the middle shell and the lower shell are welded separately, on the one hand, the stress
(Continued)

concentration of the welded part of the shell is reduced and the cracking of the welded part is avoided.

13 Claims, 6 Drawing Sheets

(51) Int. Cl.
  *F01N 3/20* (2006.01)
  *F01N 13/18* (2010.01)
(52) U.S. Cl.
  CPC .......... *F01N 13/1888* (2013.01); *B60K 15/03* (2013.01); *F01N 2610/02* (2013.01); *F01N 2610/1406* (2013.01)
(58) Field of Classification Search
  CPC ........... B60K 2015/03105; B60K 2015/03032; B60K 2015/0344; B60K 2015/0775; F01N 2610/1406; F01N 13/1861; F01N 13/1888; F01N 2610/02; F01N 2610/03; B60Y 2410/122
  USPC .................................................. 220/562, 564
  See application file for complete search history.

(56) References Cited

U.S. PATENT DOCUMENTS

| | | |
|---|---|---|
| 2002/0066737 A1 | 6/2002 | Stack et al. |
| 2006/0151505 A1 | 7/2006 | Kobayashi |
| 2009/0206097 A1 | 8/2009 | Gebert et al. |
| 2013/0193150 A1 | 8/2013 | Keefer et al. |
| 2014/0166664 A1* | 6/2014 | Lin .......................... F17C 1/14 220/562 |
| 2014/0345247 A1* | 11/2014 | Cornet .................... F01D 25/18 413/4 |
| 2015/0258887 A1 | 9/2015 | Sun et al. |
| 2018/0079299 A1 | 3/2018 | Tsukahara |
| 2018/0147771 A1 | 5/2018 | Yoo |
| 2018/0194219 A1 | 7/2018 | Amano et al. |

FOREIGN PATENT DOCUMENTS

| | | | |
|---|---|---|---|
| CN | 103031870 A | | 4/2013 |
| CN | 104379381 A | | 2/2015 |
| CN | 205970834 U | | 2/2017 |
| CN | 108068613 A | | 5/2018 |
| CN | 110329060 A | * | 10/2019 |
| CN | 110525201 A | | 12/2019 |
| CN | 209795183 U | | 12/2019 |
| CN | 111660799 A | | 9/2020 |
| CN | 211493652 U | | 9/2020 |
| DE | 202005021122 | | 3/2007 |
| DE | 102018101884 A1 | * | 8/2019 |
| EP | 2992970 A1 | | 3/2016 |
| JP | H0976966 A | | 3/1997 |
| JP | 2009062841 A | | 3/2009 |
| WO | 2008064848 A1 | | 6/2008 |
| WO | 2014147138 A1 | | 9/2014 |
| WO | 2021118493 A1 | | 6/2021 |

OTHER PUBLICATIONS

English Machine Translation of DE-102018101884-A1 (Year: 2019).*
EP21916649.3—Extended European Search Report mailed on Sep. 11, 2023, 10 pages.

* cited by examiner

UREA TANK AND FUEL TANK ASSEMBLY

CROSS REFERENCE TO RELATED APPLICATIONS

This application is a 371 of International Application No. PCT/CN2021/111083, filed Aug. 6, 2021, which claims priority to Chinese Patent Application No. 202110740098.4, filed Jun. 30, 2021. The contents of each of the above-captioned patent applications are hereby expressly incorporated herein by reference in their entireties.

TECHNICAL FIELD

The present application relates to a urea tank and fuel tank assembly, and belongs to the field of automobile parts.

BACKGROUND

With the rapid development of the automobile industry and the improvement of environmental protection requirements on automobiles, the structural optimization and performance improvement of automobile fuel tanks and automobile urea tanks serving as important safety regulatory parts in automobile parts have become the problems that major automobile manufacturers are competing to discuss and solve.

At present, fuel tanks and urea tanks are generally formed by a blow molding process or a rotational molding process. The tank produced by the blow molding process is high in cost and small in volume; and it is not easy to control the wall thickness of the tank, which usually leads to excessive wall thickness and waste of raw materials. The cost of rotational molding is relatively high, and the raw materials suitable for rotational molding are limited, so that the production efficiency is low and the energy consumption is high.

Although the injection molding process can solve the problem of uneven wall thickness of the fuel tank, due to the limitation of a demolding process, an integrated tank will not be generated after injection molding, and welding is required after injection molding. The applicant's Chinese patent application CN110329060A provides an upper shell and a lower shell which are formed by injection molding respectively. The bottom end of the upper shell and the upper end of the lower shell are welded to form a shell with a welded joint in the middle. The existence of the welded joint of the shell may lead to the risk of cracking, leakage and weak strength of the welded joint. How to further improve the situation to provide a shell serving as, for example, fuel tank and/or urea tank with uniform wall thickness, high strength, no cracking and long service life is now the direction of further exploration.

SUMMARY

In order to solve the above problems, the present application provides a urea tank and fuel tank assembly, the urea tank and fuel tank assembly is welded after injection molding, so that not only is the shell uniform in wall thickness and high in mechanical strength, but also the welding stress is dispersed to the upper and lower ends of the shell by setting that the upper shell, the middle shell and the lower shell are welded separately, on the one hand, the stress concentration of the welded part of the shell is reduced and the cracking of the welded part is avoided; on the other hand, because the middle area of the shell bears the maximum flow impact force caused by the shaking of liquid such as fuel, avoiding setting welded joints in the middle of the shell can not only improve the overall strength of the shell, but also avoid the cracking of the welded part of the shell due to suffering from the impact force, and improve the service life of the fuel tank.

One aspect of the present application provides a urea tank and fuel tank assembly, including:

a shell, wherein the shell includes an upper shell, a middle shell and a lower shell, the upper shell, the middle shell and the lower shell are welded separately to form a cavity including a fuel cavity.

Optionally, the height of the middle shell accounts for more than ⅓ of the total height of the shell;
  preferably, the height ratio of the upper shell to the middle shell to the lower shell is (0.8-1.2):(4-6):(0.8-1.2);
  more preferably, the height ratio of the upper shell to the middle shell to the lower shell is 1:5:1, and the height of the upper shell and the height of the lower shell are both 50-80 mm.

Optionally, the upper shell, the middle shell and the lower shell are separately injection-molded and then welded by hot melting.

Optionally, the thickness of the upper shell and the thickness of the lower shell are both greater than the thickness of the middle shell, so that the width of a welding surface of the upper shell and the width of a welding surface of the lower shell are both greater than the width of a welding surface of the middle shell.

Optionally, the thickness of the upper shell is the same as the thickness of the lower shell, and the thickness of the middle shell is the target thickness of the shell;
  preferably, the thickness of the middle shell is not more than 4 mm, and the thickness of the upper shell and the thickness of the lower shell are both not less than 5 mm;
  preferably, the thickness of the middle shell is 4 mm, and the thickness of the upper shell and the thickness of the lower shell are both 5 mm.

Optionally, before welding, at least one of the lower-end welding surface of the upper shell and the upper-end welding surface of the middle shell corresponding to the lower-end welding surface of the upper shell is provided with a welding material boss ring to widen the formed welding surface by hot melting; and/or
  before welding, at least one of the upper-end welding surface of the lower shell and the lower-end welding surface of the middle shell corresponding to the upper-end welding surface of the lower shell is provided with a welding material boss ring to widen the formed welding surface.

Optionally, the middle shell is internally connected with a middle grid rib structure, the middle grid rib structure partitions the middle part of the cavity defined by the middle shell into several middle grid cavities, the middle grid cavities do not communicate in the radial direction, and the bottom end of a first middle grid cavity group included in the middle grid cavities is provided with fuel passing ports to communicate with each other to form the fuel cavity.

Optionally, the middle grid cavities further include a second middle grid cavity group, the first middle grid cavity group and the second middle grid cavity group do not communicate with each other, second middle grid cavities in the second middle grid cavity group communicate with each other to form a urea cavity, and a urea inlet arranged on the urea cavity communicates with a urea feeding port arranged on the shell;

preferably, the middle shell and the middle grid rib are injection-molded at one time.

Optionally, the lower shell is internally connected with a lower grid rib structure, and the lower grid rib structure is aligned with the middle grid rib structure to be welded;
the lower grid rib structure partitions the lower part of the cavity into several lower grid cavities, the lower grid cavities include a first lower grid cavity group aligned with the first middle grid cavity group, and the first middle grid cavities in the first middle grid cavity group communicate with first lower grid cavities in the first lower grid cavity group through the fuel passing ports;
fuel flow ports arranged on the first lower grid rib between the first lower grid cavities communicate with each other, and the fuel cavity is formed by the first middle grid cavity group and the first lower grid cavity group;
preferably, the lower shell and the lower grid rib are injection-molded at one time.

Optionally, the upper shell is internally connected with an upper grid rib aligned with the middle grid rib, the upper grid rib and the middle grid rib are welded, and the thickness of the upper grid rib and the thickness of the lower grid rib are both greater than the thickness of the middle grid rib;
preferably, the thickness of the middle grid rib is not more than 4 mm, and the thickness of the upper grid rib and the thickness of the lower grid rib are both not less than 5 mm;
more preferably, the thickness of the middle grid rib is 4 mm, and the thickness of the upper grid rib and the thickness of the lower grid rib are both 5 mm.

The beneficial effects of this present application include but are not limited to:

1. The urea tank and fuel tank assembly provided by this application is welded after injection molding, so that not only is the shell uniform in wall thickness and high in mechanical strength, but also the welding stress is dispersed to the upper and lower ends of the shell by setting that the upper shell, the middle shell and the lower shell are welded separately, on the one hand, the stress concentration of the welded part of the shell is reduced and the cracking of the welded part is avoided; on the other hand, because the middle area of the shell bears the maximum flow impact force caused by the shaking of liquid such as fuel, avoiding setting welded joints in the middle of the shell can not only improve the overall strength of the shell, but also avoid the cracking of the welded part of the shell due to suffering from the impact force, and improve the service life of the fuel tank.

2. According to the urea tank and fuel tank assembly provided by this application, by setting that the height of the middle shell accounts for more than ⅓ of the total height of the shell, the welded joint between the middle shell and the upper shell and the welded joint between the middle shell and the lower shell are arranged at the upper and lower ends of the shell, so that the welded joints are far away from the area with the greatest impact force on the shell, so as to disperse the welding stress to the upper and lower ends of the shell and avoid cracking caused by stress concentration at a welded joint for welding. By setting the height ratio of the upper shell to the middle shell to the lower shell, it is convenient to control the product deformation due to the injection molding characteristics. In addition, since the stress of the tank is mainly concentrated in the middle shell 31, it is necessary to control the height of the middle shell 31 to be moderate to ensure that the stress is dispersed to all areas of the shell, improve the overall strength of the shell and prolong the service life of the fuel tank.

3. According to the urea tank and fuel tank assembly provided by this application, by injection molding the upper shell, the middle shell and the lower shell separately, the wall thickness uniformity of the upper shell, the middle shell and the lower shell is improved, the mechanical strength is improved, and the service life of the fuel tank is further prolonged.

4. According to the urea tank and fuel tank assembly provided by this application, by setting that the thickness of the upper shell is greater than the thickness of the middle shell, the width of the welding surface of the upper shell is greater than the width of the welding surface of the middle shell, so that the welding area between the upper shell and the middle shell can be increased, the welding surface of the middle shell and the welding surface of the upper shell can be completely welded together, and the phenomenon of missing welding between the middle shell and the lower shell can be prevented. In addition, the thickening of the upper shell can also improve the bearing capacity of the upper shell, prevent the upper shell from deformation due to carrying electrical components; by setting that the thickness of the lower shell is greater than the thickness of the middle shell, the width of the welding surface of the lower shell is greater than the width of the welding surface of the middle shell, so that the welding area between the lower shell and the middle shell is increased and the welding strength between the lower shell and the middle shell is improved, in addition, the lower shell is located at the bottom of the shell, therefore, the thickening of the bottom of the lower shell can improve the bearing capacity of the lower shell and prevent the deformation of the lower shell; by setting that the thickness of the middle shell is less than the thickness of the upper shell and the thickness of the lower shell, the weight of the shell can be reduced and the vehicle is lighter.

5. According to the urea tank and fuel tank assembly provided by this application, by setting the thicknesses of the upper shell, the middle shell and the lower shell, the welding area between the middle shell and the upper shell or the welding area between the middle shell and the lower shell can be improved, the welding strength of the shell is improved, the welded joint is prevented from cracking due to suffering from the impact force, and meanwhile, the shell is prevented from being too heavy and the vehicle is lighter.

6. According to the urea tank and fuel tank assembly provided by this application, at least one welding material boss ring is arranged on the upper-end welding surface of the middle shell before welding, and the welding material boss ring is heated and melted during welding, so as to widen the formed welding surface, so that the upper-end welding surface of the middle shell forms an outward flanged structure, and the welding strength between the upper shell and the middle shell is further improved. By setting at least one welding material boss ring on the lower-end welding surface of the middle shell before welding, the welding material boss ring is heated and melted during welding, so as to widen the formed welding surface, so that the lower-end welding surface of the middle shell forms an outward flanged structure, and the welding strength between the lower shell and the middle shell is further improved.

7. According to the urea tank and fuel tank assembly provided by this application, by setting the middle grid rib structure, the middle part of the cavity defined by the middle shell is partitioned into several middle grid cavities, the middle grid cavities do not communicate in the radial direction, and each middle grid cavity is filled with fuel, so that the side walls of each middle grid cavity jointly share the impact force of fuel flow, therefore, there is no need to specially design anti-surge partitions, and the surge phenomenon of fuel can be significantly reduced; in addition, the middle grid rib can increase the overall rigidity of the fuel tank and prevent deformation or cracking of the tank when the fuel tank is impacted by external forces; in addition, since the area with the highest impact frequency and the largest impact force of fuel is mainly concentrated in the middle of the fuel tank during traveling of a vehicle, the fuel tank is formed by arranging the fuel passing port at the bottom of the first middle grid cavity group to communicate with each other, so that the fuel flows in the lower shell area, which greatly reduces the impact force of fuel flow and weakens the "surge" phenomenon of fuel.

8. According to the urea tank and fuel tank assembly provided by this application, by setting the second middle grid cavity group, and by setting that the second middle grid cavity group does not communicate with the first middle grid cavity group, the integrated arrangement of the fuel tank and the urea tank is realized, so that the volume of the integrated fuel tank is reduced, the total weight of the fuel tank and the urea tank is reduced, and the vehicle is lighter; in addition, by integrated arrangement of the fuel tank and the urea tank, the heat of the fuel tank can be used for heating the urea tank, to realize the reuse of heat, and avoid the crystallization of urea liquid in the urea tank.

9. According to the urea tank and fuel tank assembly provided by this application, by setting the lower grid rib structure in the lower shell, the fuel impact force on the lower shell of the fuel tank is further reduced, the strength of the lower shell of the fuel tank is improved and the deformation of the fuel tank is prevented; by enabling the fuel flow ports arranged on the lower grid rib between the first lower grid cavities to communicate and making the fuel flow in the lower shell, not only can the flow of fuel between first lower grid cavities be realized and then the flow of fuel in each first middle grid cavity be realized, but also the fuel impact force on the middle partition can be reduced and the deformation or cracking of the fuel tank due to excessive impact force can be prevented.

10. According to the urea tank and fuel tank assembly provided by this application, by setting the upper grid rib in the upper shell, the fuel impact force on the upper shell of the fuel tank is reduced, the strength of the upper shell of the fuel tank is improved and the deformation of the fuel tank is prevented; by setting that the thickness of the upper grid rib and the thickness of the lower grid rib are both greater than the thickness of the middle grid rib, the width of the welding surface of the upper grid rib and the width of the welding surface of the lower grid rib are both greater than the width of the welding surface of the middle grid rib, so as to increase the welding area between the upper shell and the middle shell, and the welding area between the lower shell and the middle shell, and improve the welding strength between the upper shell and the middle shell, and the welding strength between the lower shell and the middle shell, in addition, the bearing capacity of the lower grid rib and the lower grid rib can be improved, the support force of the lower grid rib for the lower shell and the support force of the upper grid rib for the upper shell are improved, and the deformation of the lower shell and the upper shell are further prevented; in addition, by setting that the thickness of the middle grid rib is less than the thickness of the upper grid rib and the thickness of the lower grid rib, the weight of the shell can be reduced and the shell is lighter.

BRIEF DESCRIPTION OF THE DRAWINGS

The drawings described herein are used to provide a further understanding of the present application and constitute a part of the present application. The schematic embodiments and description thereof are used for explaining the present application and do not limit the present application improperly. In the drawings.

Figure 1:
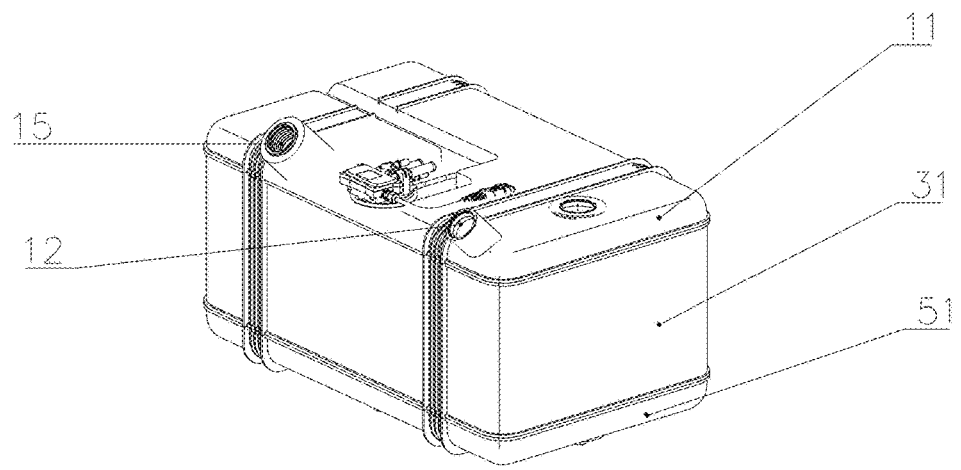
FIG. 1 is a three-dimensional schematic diagram of a urea tank and fuel tank assembly according to embodiment 1 of the present application.
Figure 2:
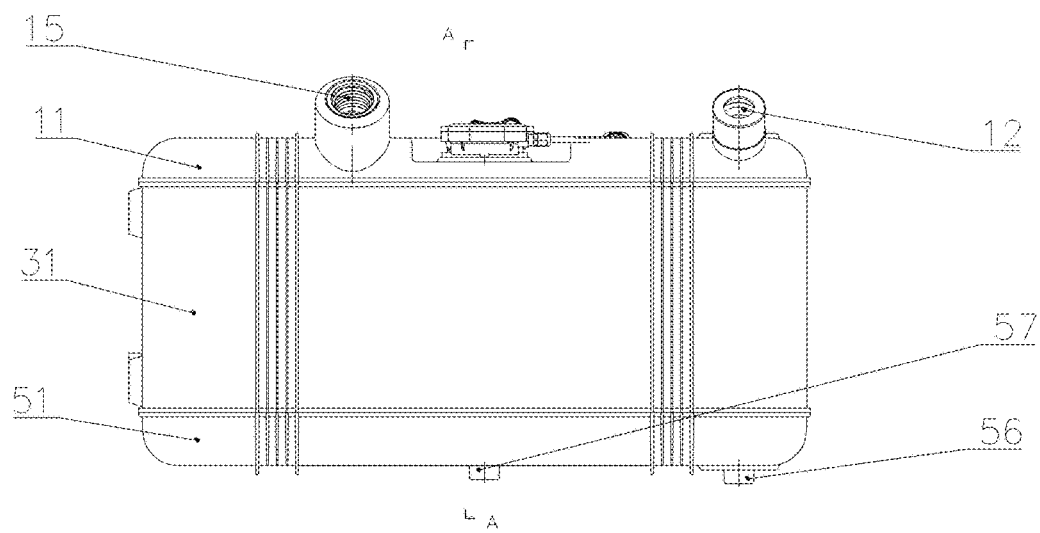
FIG. 2 is a front view of a urea tank and fuel tank assembly according to embodiment 1 of the present application.
Figure 3:
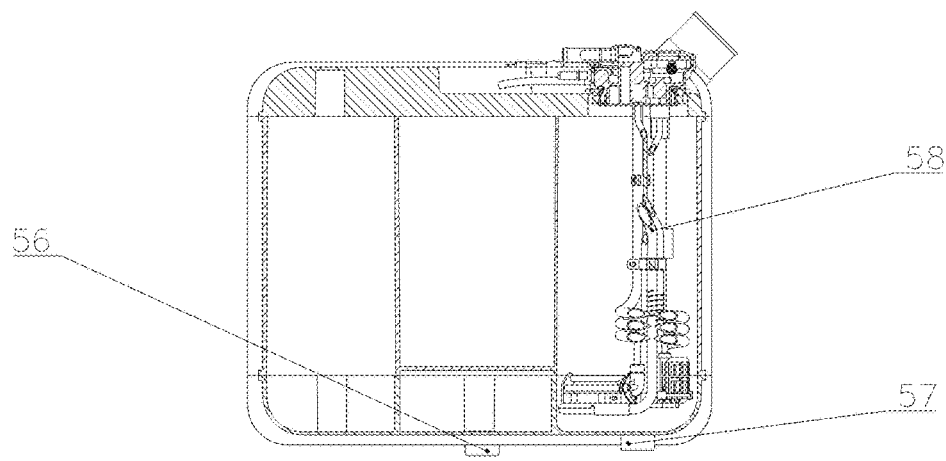
FIG. 3 is a sectional view of a urea tank and fuel tank assembly according to embodiment 1 of the present application in the A-A direction.
Figure 4:
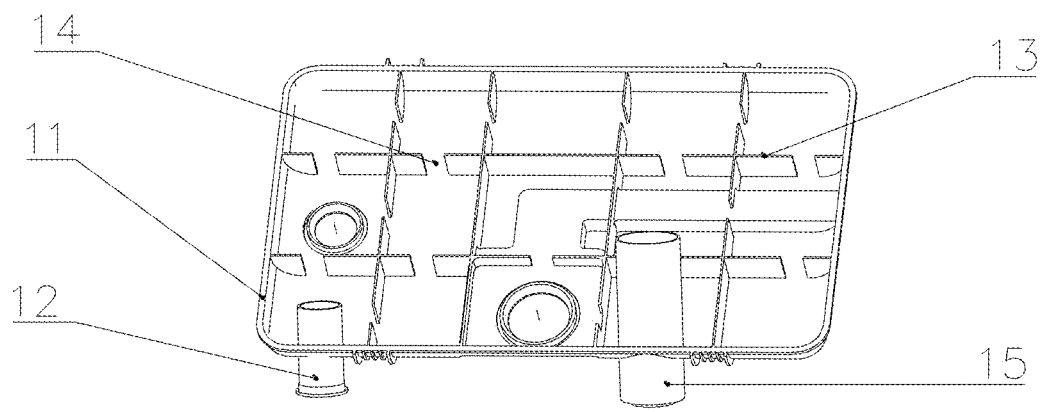
FIG. 4 is a schematic diagram of an upper shell of a urea tank and fuel tank assembly according to embodiment 1 of the present application.
Figure 5:
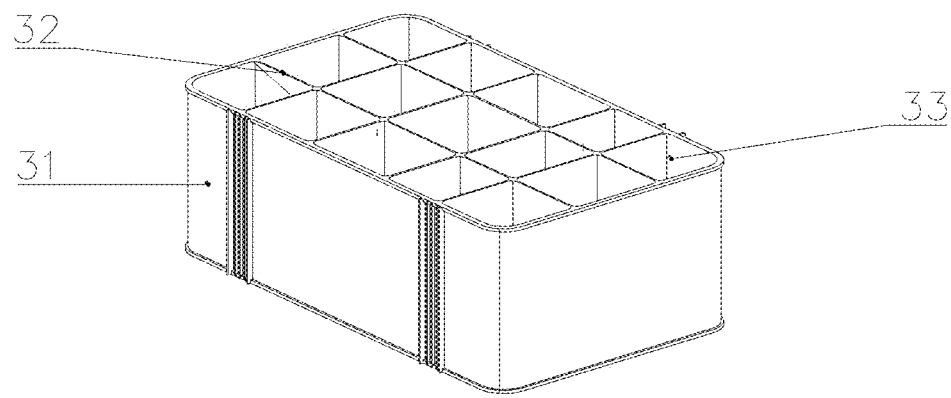
FIG. 5 is a schematic diagram of a middle shell of a urea tank and fuel tank assembly according to embodiment 1 of the present application.
Figure 6:
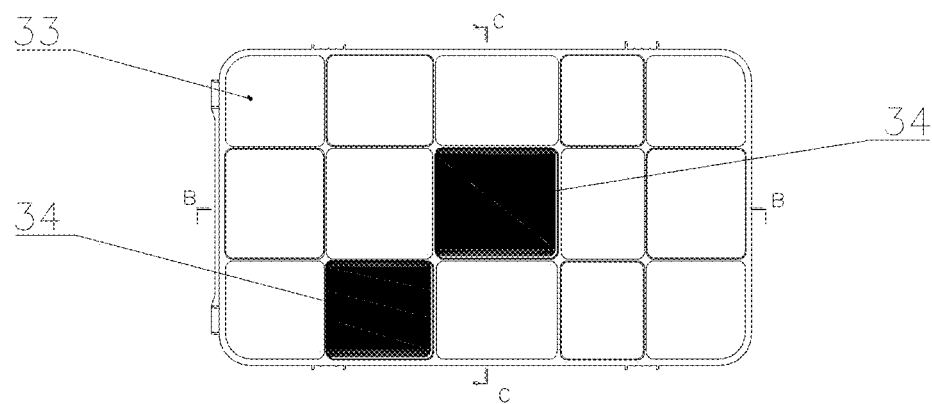
FIG. 6 is a top view of a middle shell of a urea tank and fuel tank assembly according to embodiment 1 of the present application.
Figure 7:
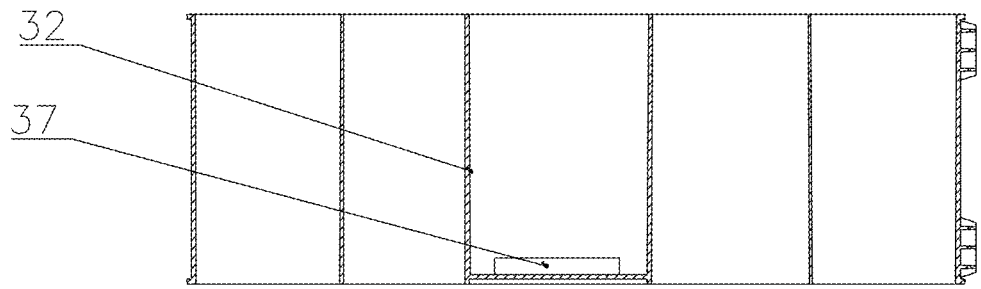
FIG. 7 is a sectional view of a urea tank and fuel tank assembly according to embodiment 1 of the present application in the B-B direction.
Figure 8:
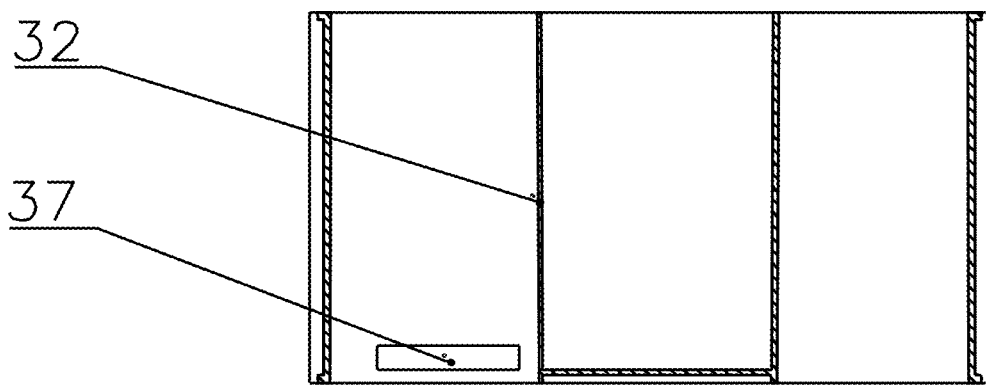
FIG. 8 is a sectional view of a urea tank and fuel tank assembly according to embodiment 1 of the present application in the C-C direction.
Figure 9:
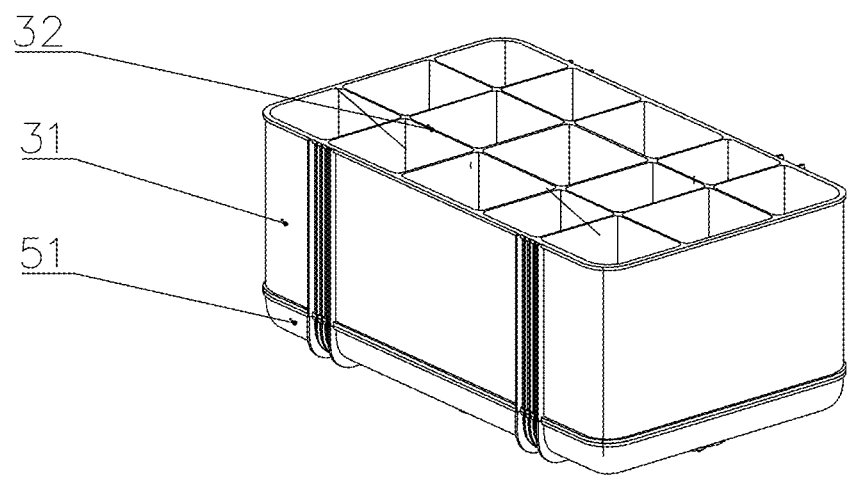
FIG. 9 is a schematic diagram of a lower shell and a middle shell of a urea tank and fuel tank assembly being combined according to embodiment 1 of the present application.
Figure 10:
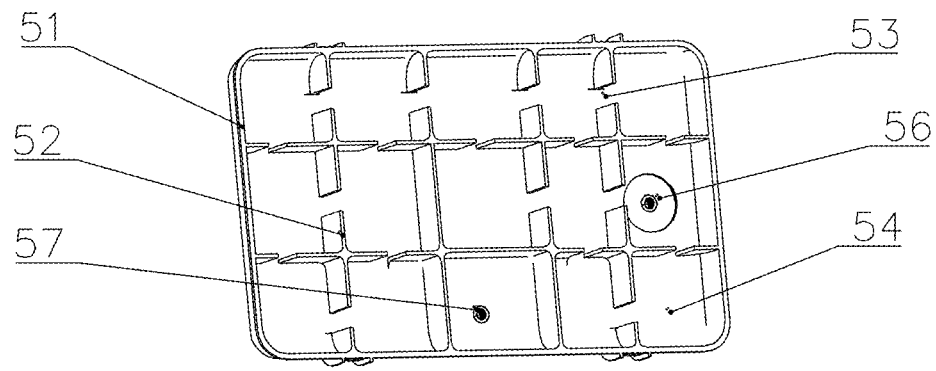
FIG. 10 is a schematic diagram of an upper shell of a urea tank and fuel tank assembly according to embodiment 1 of the present application.
Figure 11:
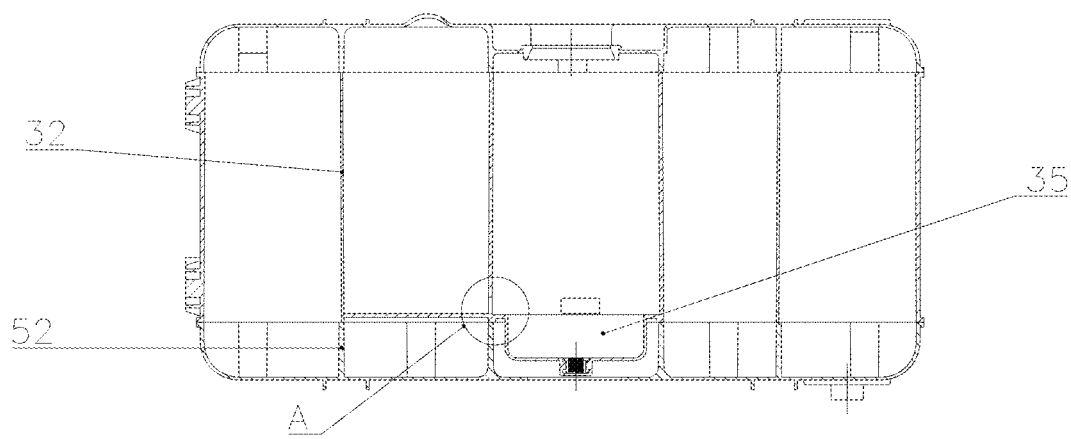
FIG. 11 is a front sectional diagram of a urea tank and fuel tank assembly according to embodiment 2 of the present application.
Figure 12:
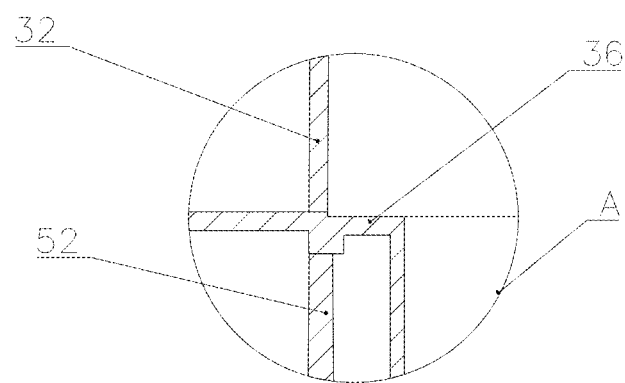
FIG. 12 is an enlarged diagram of part A in FIG. 11.
Figure 13:
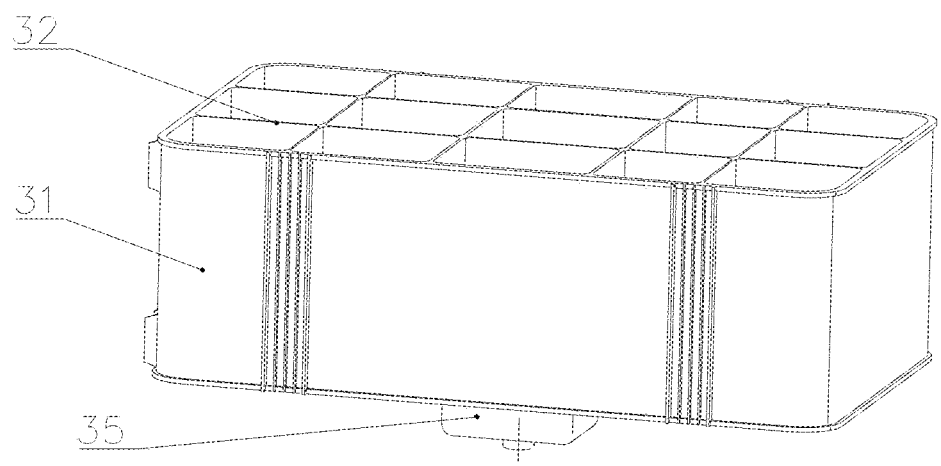
FIG. 13 is a schematic diagram of a middle shell of a urea tank and fuel tank assembly according to embodiment 2 of the present application.
Figure 14:
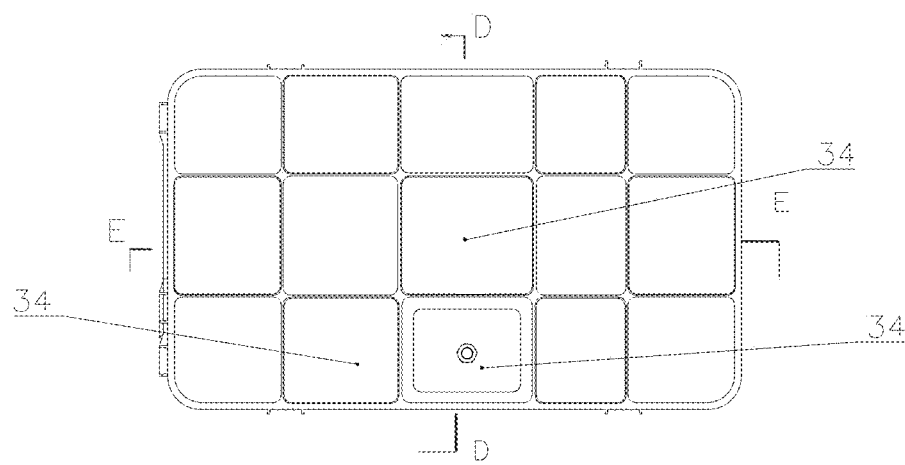
FIG. 14 is a top view of a middle shell of a urea tank and fuel tank assembly according to embodiment 2 of the present application.
Figure 15:
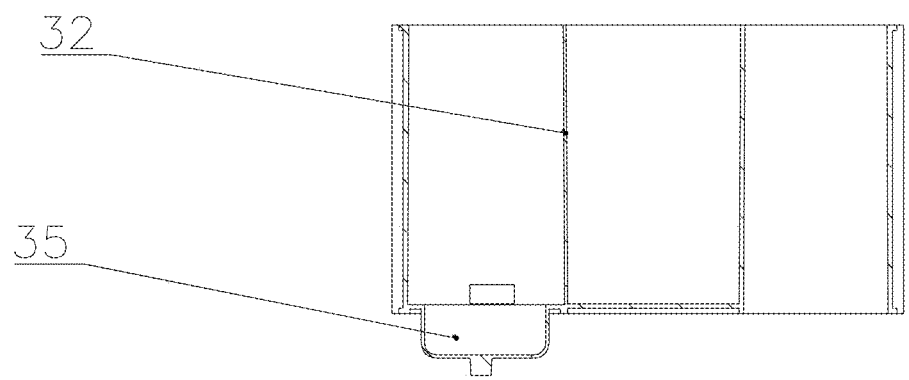
FIG. 15 is a sectional view of a urea tank and fuel tank assembly according to embodiment 2 of the present application in the D-D direction.
Figure 16:
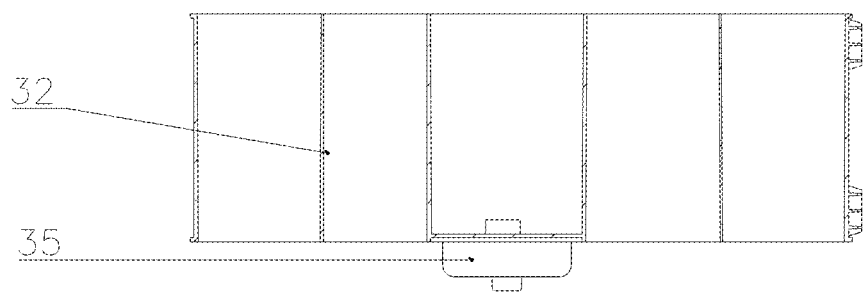
FIG. 16 is a sectional view of a urea tank and fuel tank assembly according to embodiment 2 of the present application in the E-E direction.

List of parts and reference numerals:

11, upper shell; 12, fuel inlet; 13, upper grid rib; 14, fuel-gas through hole; 15, urea feeding port; 31, middle shell; 32, middle grid rib; 33, first middle grid cavity; 34, second middle grid cavity; 35, sinking cavity; 36, annular boss; 37, urea flow port; 51, lower shell; 52, lower grid rib; 53-fuel flow port; 54, first lower grid cavity; 55, second lower grid cavity; 56, fuel drain bolt; 57, urea drain bolt; 58, urea sensor; 59, fuel sensor.

DETAILED DESCRIPTION OF THE PREFERRED EMBODIMENTS

To explain the overall conception of the present application more clearly, detailed description will be made below in conjunction with the accompanying drawings by way of examples.

In order to more clearly understand the above objectives, features and advantages of the present application, the present application will be further described in detail in conjunction with the accompanying drawings and the specific embodiments. It should be noted that the embodiments of the present application and the features in the embodiments may be combined with each other under the condition of no conflict.

In the following description, many specific details are set forth in order to facilitate full understanding of the present application, but the present application may also be implemented in other ways other than those described herein. Therefore, the protection scope of the present application is not limited by the specific embodiments disclosed below.

In addition, in the description of this application, it should be understood that the terms "center", "upper", "lower", "front", "rear", "left", "right", "vertical", "horizontal", "top", "bottom", "inner", "outer", "axial", "radial", "circumferential" indicate the orientation or position relationship based on the orientation or position relationship shown in the drawings, are only for facilitating description of the present application and simplifying the description, rather than indicating or implying that the device or element referred to must have a specific orientation, be constructed and operated in a specific orientation, and thus shall not be construed as a limitation to this application.

In addition, the terms "first" and "second" are only used for descriptive purposes and cannot be understood as indicating or implying relative importance or implicitly indicating the number of indicated technical features. Thus, the features defined with "first" and "second" may explicitly or implicitly include one or more of the features. In the description of this application, "plurality of" means two or more, unless otherwise expressly and specifically defined.

In the present application, unless otherwise specified and defined, the terms "installation", "connected", "connection", "fixation" and other terms shall be understood in a broad sense, for example, connection may be fixed connection, detachable connection or integrated connection; connection may be mechanical connection, electrical connection or communication; connection may be direct connection or indirect connection through an intermediate medium; connection may be internal communication of two elements or the interaction relationship between two elements. For those skilled in the art, the specific meaning of the above terms in the present application can be understood according to the specific circumstances.

In the present application, unless otherwise expressly specified and defined, the first feature is "above" or "below" the second feature may be that the first feature is in direct contact with the second feature, or the first feature is in indirect contact with the second feature through an intermediate medium. In the description of this description, the description referring to the terms "one embodiment", "some embodiments", "examples", "specific examples", or "some examples" means that the specific features, structures, materials or features described in connection with the embodiments or examples are included in at least one embodiment or example of the present application. In this description, the schematic expression of the above terms does not have to be for the same embodiments or examples. Further, the specific features, structures, materials or features described may be combined in any one or more embodiments or examples in a suitable manner.

A urea tank and fuel tank assembly of the present application may only serve as a fuel tank, and may also serve as an integrated fuel tank and urea tank, or an integration of a fuel tank and other functional cavities. The urea tank and fuel tank assembly may be used as, but is not limited to, a fuel storage part of a motor vehicle. An integrated fuel tank and urea tank is taken as an example in the drawings in the following embodiments for description, but the urea tank and fuel tank assembly is not limited thereto.

As an embodiment, referring to FIG. 1, the integrated fuel tank and urea tank, that is, the urea tank and fuel tank assembly includes a shell, wherein the shell is internally provided with a urea cavity and a fuel cavity, the shell is provided with a urea feeding port 15 and a fuel inlet 12, the urea tank and fuel tank assembly further includes a urea sensor 58 and a urea pump communicating with the urea cavity, and a fuel level sensor and a fuel pump communicating with the fuel cavity. Fuel is not limited to gasoline, diesel, etc.

Embodiment 1

As shown in FIGS. 1-10, the embodiment of the present application discloses a urea tank and fuel tank assembly, which includes a shell, wherein the shell includes an upper shell 11, a middle shell 31 and a lower shell 51, and the upper shell 11, the middle shell 31 and the lower shell 51 are welded separately to form a cavity including a fuel cavity. The urea tank and fuel tank assembly is welded after injection molding, so that not only each shell is uniform in wall thickness and high in mechanical strength, but also the welding stress is dispersed to the upper and lower ends of the shell by setting that the upper shell 11, the middle shell 31 and the lower shell 51 are welded separately, on the one hand, the stress concentration of the welded part of the shell is reduced, so that the cracking of the welded part is avoided; on the other hand, due to the fact that the middle area of the shell bears the maximum flow impact force caused by the shaking of liquid such as fuel, avoiding setting welded joints in the middle of the shell can not only improve the overall strength of the shell, but also avoid the cracking of the welded part of the shell due to suffering from the impact force, and improve the service life of the fuel tank.

As an embodiment, the height of the middle shell 31 accounts for more than ⅓ of the total height of the shell. In this embodiment, by setting the height of the middle shell 31 to account for more than ⅓ of the total height of the shell, the welded joint between the middle shell 31 and the upper shell 11 and the welded joint between the middle shell 31 and the lower shell 51 are arranged at the upper and lower ends of the shell, so that the welded joints are far away from the area where the shell is subjected to the maximum impact force, so as to disperse the welding stress to the upper and lower ends of the shell and avoid the cracking caused by the stress concentration at the welded joint.

Preferably, the height ratio of the upper shell 11 to the middle shell 31 to the lower shell 51 is (0.8-1.2):(4-6):(0.8-1.2); more preferably, the height ratio of the upper shell 11 to the middle shell 31 to the lower shell 51 is 1:5:1, and the heights of the upper shell and the lower shell are both 50-80 mm. By setting the height ratio of the upper shell 11 to the middle shell 31 to the lower shell 51, it is convenient to control the amount of product deformation due to the injection molding characteristics. In addition, since the stress of the shell is mainly concentrated at the middle shell 31, it is necessary to control the height of the middle shell 31 to be moderate, to ensure that the stress is dispersed to various areas of the shell, to improve the overall strength of the shell, and to prolong the service life of the fuel tank.

As an embodiment, the upper shell 11, the middle shell 31 and the lower shell 51 are separately injection-molded and then welded by hot melting. By injection-molding the upper shell 11, the middle shell 31 and the lower shell 51 separately, the wall thickness uniformity of the upper shell 11, the middle shell 31 and the lower shell 51 is improved separately, the mechanical strength is improved, and the service life of the fuel tank is further prolonged.

As an embodiment, the thickness of the upper shell 11 and the thickness of the lower shell 51 are both greater than the thickness of the middle shell 31 so that the width of the welding surface of the upper shell 11 and the width of the welding surface of the lower shell 51 are both greater than the width of the welding surface of the middle shell 31. By setting the thickness of the upper shell 11 to be greater than the thickness of the middle shell 31, the width of the welding surface of the upper shell 11 is greater than the width of the welding surface of the middle shell 31, so that the welding area between the upper shell 11 and the middle shell 31 can 20) be increased, the welding surface of the middle shell 31 and the welding surface of the upper shell 11 can be completely welded together, and the phenomenon of missing welding between the middle shell 31 and the upper shell 11 can be prevented. In addition, the thickening of the upper shell 11 can also improve the bearing capacity of the upper shell 11, and prevent the upper shell 11 from deformation due to carrying electrical components; by setting the thickness of the lower shell 51 to be greater than the thickness of the middle shell 31, the width of the welding surface of the lower shell 51 is greater than the width of the welding surface of the middle shell 31, so that the welding area between the lower shell 51 and the middle shell 31 is increased and the welding strength between the lower shell 51 and the middle shell 31 is improved. In addition, the lower shell 51 is located at the bottom of the shell, so that thickening of the bottom of the lower shell 51 can improve the bearing capacity of the lower shell 51 and prevent the deformation of the lower shell 51; the thickness of the middle shell 31 is less than the thickness of the upper shell 11 and the thickness of the lower shell 51, so that the weight of the shell can be reduced and the vehicle is lighter.

Specifically, the thickness of the upper shell 11 is the same as the thickness of the lower shell 51, and the thickness of the middle shell 31 is the target thickness of the shell. This setting manner is conducive to improving the integrity of the shell.

Preferably, the thickness of the middle shell 31 is not more than 4 mm, and the thickness of the upper shell 11 and the thickness of the lower shell 51 are both not less than 5 mm; more preferably, the thickness of the middle shell 31 is 4 mm, and the thickness of the upper shell 11 and the thickness of the lower shell 51 are both 5 mm. By setting the thickness of the upper shell 11, the middle shell 31 and the lower shell 51, the welding area between the middle shell 31 and the upper shell 11 or the welding area between the middle shell 31 and the lower shell 51 can be increased, the welding strength of the shell can be improved, the welded joint can be prevented from cracking due to suffering from the impact force, at the same time, the shell can be prevented from being too heavy and the vehicle can be lighter.

As an embodiment, at least one of the lower-end welding surface of the upper shell 11 and the upper-end welding surface of the middle shell 31 corresponding to the lower-end welding surface of the upper shell 11 before welding is provided with a welding material boss ring to widen the formed welding surface by hot melting. By setting the welding material boss ring on the lower-end welding surface of the upper shell 11 and/or the upper-end welding surface of the middle shell 31 before welding, the welding material boss ring is heated and melted during welding, so as to widen the formed welding surface, so that the upper-end welding surface of the middle shell 31 forms an outward flanged structure, and the welding strength between the upper shell 11 and the middle shell 31 is further improved.

As an embodiment, at least one of the upper-end welding surface of the lower shell 51 and the lower-end welding surface of the middle shell 31 corresponding to the upper-end welding surface of the lower shell 51 before welding is provided with a welding material boss ring to widen the formed welding surface. By setting the welding material boss ring on the upper-end welding surface of the lower shell 51 and/or the lower-end welding surface of the middle shell 31 before welding, the welding material boss ring is heated and melted during welding, so as to widen the formed welding surface, so that the lower-end welding surface of the middle shell 31 forms an outward flanged structure, and the welding strength between the lower shell 51 and the middle shell 31 is further improved.

Specifically, the lower-end welding surface of the upper shell 11, the upper-end welding surface of the middle shell 31, the lower-end welding surface of the middle shell 31 and the upper-end welding surface of the lower shell 51 before welding are each provided with a welding boss ring, and each welding boss ring includes a plurality of welding bosses.

As an embodiment, the middle shell 31 is internally connected with a middle grid rib 32 structure, the middle grid rib 32 structure partitions the middle part of a cavity defined by the middle shell 31 into several middle grid cavities. The middle grid cavities do not mutually communicate in the radial direction. The bottom end of a first middle grid cavity group included in the middle grid cavities is provided with fuel passing ports to communicate with each other to form the fuel cavity. By setting the middle grid rib 32 structure, the middle part of the cavity defined by the middle shell 31 is partitioned into several middle grid cavities. The middle grid cavities do not mutually communicate in the radial direction. Each first middle grid cavity 33 in the first middle grid cavity group is filled with fuel, so that the side walls of each middle grid cavity share the impact force generated by flowing of fuel. Therefore, there is no need to specially design anti-surge partitions, and the surge phenomenon of fuel can be significantly reduced; in addition, the middle grid rib 32 can increase the overall rigidity of the fuel tank and prevent the deformation or cracking of the tank when the tank is impacted by external forces; in addition, since the area with the highest impact frequency and the largest impact force is mainly concentrated in the middle of the fuel tank during traveling of a vehicle, the fuel tank is formed by setting the fuel passing ports at the bottom of the first middle grid cavity group to communicate with each other to make the fuel flow in the area of the lower shell 51, which greatly reduces the impact force of the fuel flow and weakens the "surge" phenomenon of the fuel.

As an embodiment, the top of at least one of the first middle grid cavities 33 in the first middle grid cavity group is provided with an inlet, the inlet is connected with the fuel inlet 12 arranged on the shell of the fuel tank, and the bottom ends of the first middle grid cavities 33 are provided with openings communicating with each other to form the fuel cavity; the middle grid rib 32 structure is formed by the arrangement and connection of several middle partitions to form a grid shape, and the first middle grid cavity group is of a sealed channel structure with openings at two ends. By setting that the inlet is arranged at the top of at least one of the first middle grid cavities 33, the inlet is connected with the fuel inlet 12 arranged on the shell of the fuel tank, and the bottom ends of the first middle grid cavities 33 are provided with the openings, so that after the fuel enters at least one first middle grid cavity 33 through the fuel inlet 12, the fuel flows into other first middle grid cavities 33 through the openings at the bottom ends of the first middle grid cavities 33, thus, the fuel level in all first middle grid cavities 33 is the same, that is, the fuel impact force borne by the side wall of each first middle grid cavity 33 is uniform, so as to further prevent the deformation or cracking of the fuel tank caused by uneven stress.

Specifically, the top of each first middle grid cavity 33 is provided with an inlet, one of the inlets is connected with the fuel inlet 12 arranged on the shell of the fuel tank. By setting an inlet at the top of each first middle grid cavity 33, the tops of all first middle grid cavities 33 communicate, so as to realize the circulation of fuel at the upper parts of the first middle grid cavities 33. In addition, a flow channel is provided for the fuel-gas phase generated by the fuel.

Specifically, the fuel inlet 12 is provided with a one-way valve.

As an embodiment, the middle grid cavities also include a second middle grid cavity group, the first middle grid cavity group and the second middle grid cavity group does not communicate with each other, second middle grid cavities 34 in the second middle grid cavity group communicate with each other to form a urea cavity, and the urea cavity is provided with a urea inlet which communicates with the urea feeding port 15 arranged on the shell. By setting the second middle grid cavity group, and the second middle grid cavity group does not communicate with the first middle grid cavity group, so as to realize the integrated arrangement of the fuel cavity and the urea cavity, reduce the size of the integrated fuel tank, reduce the total weight of the fuel tank and the urea tank, and make the vehicle lighter; in addition, by the integrated arrangement of the fuel cavity and the urea cavity, the heat of the fuel cavity can be used for heating the interior of the urea cavity, realize the reuse of heat, and avoid the crystallization of urea liquid in the urea cavity.

Specifically, the middle grid rib 32 in the second middle grid cavity group is provided with a urea flow port 37 so that the urea liquid in all second middle grid cavities 34 communicates with each other. Specifically, this embodiment does not limit the shape of the urea flow port 37, for example, the shape may be a circle, a triangle, a quadrilateral, a polygon, etc., in which the polygon may be a pentagon, a hexagon, a heptagon, an octagon, etc., as long as the circulation of urea can be realized, and the urea flow port 37 in this embodiment is rectangular.

Specifically, this embodiment does not limit the position of the urea flow port 37, for example, the urea flow port 37 may be arranged at the lower or middle part of the middle grid rib 32 in the second middle grid cavity group, preferably the lower part.

Specifically, this embodiment does not limit the arrangement mode of the first middle grid cavity group and the second middle grid cavity group, as long as the first middle grid cavity group and the second middle grid cavity group does not communicate each other. Preferably, the second middle grid cavities 34 in the second middle grid cavity group are symmetrically arranged. Preferably, the second middle grid cavities 34 are arranged diagonally to ensure uniform gravity distribution and further prevent deformation of the tank due to uneven stress, and the setting method is convenient for processing and the wall thickness is uniform.

Specifically, the top of at least one second middle grid cavity 34 in the second middle grid cavity group is provided with an inlet, and the inlet communicates with the urea feeding port 15 arranged on the shell of the fuel tank, so as to supplement urea into the urea cavity.

Specifically, the urea feeding port 15 is provided with a one-way valve.

As an embodiment, the bottom ends of the second middle grid cavities 34 in the second middle grid cavity group are sealed, and the side walls of the second middle grid cavities 34 communicate with each other to form the urea cavity. By setting that the bottom ends of the second middle grid cavities 34 in the second middle grid cavity group are sealed, the non-communication between the first middle grid cavity group and the second middle grid cavity group can be realized, and the fuel can flow and communicate under the second middle grid cavity group to reduce the flow resistance of fuel.

As an embodiment, the connecting surface between the bottom walls of the second middle grid cavities 34 and the middle shell 31 and/or the connecting surface between the bottom walls of the second middle grid cavities 34 and the middle grid rib 32 are/is higher than the welding surface at the lower end of the middle shell 31 and/or the welding surface at the lower end of the middle grid rib 32. The bottom walls of the second middle grid cavities 34 and the middle grid rib 32 are integrally injection-molded. This setting mode can prevent the mutual seepage of urea liquid and fuel, prevent the fuel from seeping into the urea cavity through the welded joint to contaminate the urea liquid, and prevent the urea liquid from seeping into the fuel cavity to damage the engine.

Preferably, the middle shell 31 and the middle grid rib 32 are injection-molded at one time. By setting that the middle shell 31 and the middle grid rib 32 are injection-molded at one time, it can be ensured that the thickness of the middle grid rib 32 is uniform, the connection strength between the middle shell 31 and the middle grid rib 32 can be improved, and the mechanical strength of the tank can be improved. As an embodiment, the lower shell 51 is internally connected with a lower grid rib 52 structure, and the lower grid rib 52 structure is aligned with the middle grid rib 32 structure to be welded; the lower grid rib 52 structure partitions the lower part of the cavity into several lower grid cavities, the lower grid cavities include a first lower grid cavity group aligned with the first middle grid cavity group, the first middle grid cavities in the first middle grid cavity group communicate with first lower grid cavities 54 in the first lower grid cavity group through the fuel passing ports; fuel flow ports 53 arranged on the lower grid rib 52 between the first lower grid cavities 54 communicate, and the fuel cavity is formed by the first middle grid cavity group and the first lower grid cavity group. By setting the lower grid rib 52 structure in the lower shell 51, the fuel impact force on the lower shell 51 of the fuel tank is further reduced, and the strength of the lower shell 51 of the fuel tank is improved to prevent the lower shell from deformation; by enabling the fuel flow ports 53 arranged on the lower grid rib 52 between the first lower grid cavities 54 to communicate and making the fuel flow in the lower shell 51, not only can the flow of fuel between first lower grid cavities 54 be realized and then the flow of fuel in each first middle grid cavity 33 be realized, but also reduce the fuel impact force on the middle partition and prevent the deformation or cracking of the fuel tank due to excessive impact force.

As an embodiment, the lower shell 51 includes a side wall and a bottom wall, and the fuel flow port 53 extends upward from the joint between the lower grid rib 52 and the bottom wall. This setting mode can ensure the smooth flow of fuel from the fuel flow port 53.

Specifically, the lower grid rib 52 structure is formed by arrangement and connection of a plurality of lower partitions to form a grid shape. One end of the first lower grid cavity 54 is open to communicate with the first middle grid cavity 33, and the other end of the first lower grid cavity 54 is connected with the bottom wall of the lower shell 51.

Specifically, the lower shell 51 below one of the first middle grid cavities 33 is provided with a boss, which is provided with a fuel drain bolt 56 as a fuel drain outlet.

Specifically, the upper shell 11 above one of the first grid cavities 33 is provided with a boss for installing a fuel sensor 58.

Specifically, this embodiment does not limit the shape of the fuel flow port 53, for example, the shape may be a circle, a triangle, a quadrilateral, a polygon, etc., in which the polygon may be a pentagon, a hexagon, a heptagon, an octagon, etc., as long as the flow of fuel can be realized. The shape of the fuel flow port 53 in this embodiment is rectangular.

As an embodiment, the cross-sectional shape of the middle grid cavity is selected from at least one of a circle, a triangle, a quadrilateral and a polygon. Wherein, the polygon may be a pentagon, a hexagon, a heptagon, an octagon, etc. Specifically, the fuel tank is a cube, the middle grid rib 32 includes several middle partitions extending in the axial direction of the fuel tank, and the cross section of the middle grid cavity is a right-angled quadrilateral. By setting the cross section of the middle grid cavity as a right-angle quadrilateral, the structural stability of the middle grid cavity is further improved, the strength of the fuel tank is increased, and the deformation of the fuel tank is prevented.

Specifically, the middle grid cavities formed by the first middle grid cavities 33 and the second middle grid cavities 34 are of a matrix structure, the number of rows and columns of the matrix structure are odd, and the two midlines of the urea tank and fuel tank assembly pass through the interior of the first middle grid cavities 33 or the second middle grid cavities 34, so as to avoid the stress in the middle concentrated at the middle grid rib 32 and further disperse the stress, and the number of rows and columns of the matrix structure are odd, which is conducive to uniform demolding, the warping deformation of the middle grid cavity is uniform, and the forming accuracy of the product is improved.

Preferably, the matrix structure is a 3×5 matrix or 5×7 matrix.

Specifically, this embodiment does not limit the area of the fuel flow port 53, as long as the flow of fuel can be realized. Further, the height of the fuel flow port 53 is the same as that of the area of the lower shell 51, and the ratio of the width of the fuel flow port 53 to the side length of the first lower grid cavity 54 is (0.25-0.35):1, preferably the ratio is 0.3:1. More preferably, the width of the fuel flow port is 30 mm. This setting method can reduce the flow resistance of fuel and prevent the deformation of the lower partition due to excessive resistance; at the same time, this setting method can ensure that there is large enough welding area between the lower grid rib 52 and the lower shell 51 to improve the welding strength.

Preferably, the lower shell 51 and the lower grid rib 52 are injection-molded at one time. By setting that the lower shell 51 and the lower grid rib 52 are injection-molded at one time, it can be ensured that the thickness of the lower grid rib 52 is uniform, the connection strength between the lower shell 51 and the lower grid rib 52 can be improved, and the mechanical strength of the tank can be improved.

Specifically, the upper shell 11 is provided with a groove for installing a urea sensor 58, and the top of the urea sensor 58 is lower than the top of the groove, so that the urea sensor 58 can be favorably protected and the volume of the tank.

As an embodiment, the upper shell 11 is internally connected with an upper grid rib 13 aligned with the middle grid rib 32, the upper grid rib 13 and the middle grid rib 32 are welded, and the thickness of the upper grid rib 13 and the thickness of the lower grid rib 52 are both greater than the thickness of the middle grid rib 32. By setting the upper grid rib 13 in the upper shell 11, the fuel impact force on the upper shell 11 of the fuel tank is reduced, and the strength of the upper shell 11 of the fuel tank is improved, and the deformation of the upper shell is prevented; by setting that the thickness of the upper grid rib 13 and the thickness of the lower grid rib 52 are both greater than the thickness of the middle grid rib 32, the width of the welding surface of the upper grid rib 13 and the width of the welding surface of the lower grid rib 52 are both greater than the width of the welding surface of the middle grid rib 32, so as to increase the welding area between the upper shell 11 and the middle shell 31, and the welding area between the lower shell 51 and the middle shell 31, and improve the welding strength between the upper shell 11 and the middle shell 31, and the welding strength between the lower shell 51 and the middle shell 31, in addition, the bearing capacity of the lower grid rib 52 and the lower shell 51 can be improved, the support force of the lower grid rib 52 for the lower shell 51 and the support force of the upper grid rib 13 for the upper shell 11 are improved, and the deformation of the lower shell 51 and the upper shell 11 is further prevented; in addition, by setting that the thickness of the middle grid rib 32 is less than the thickness of the upper grid rib 13 and the thickness of the lower grid rib 52, the weight of the shell can be reduced and the shell is lighter.

Specifically, the thickness of the middle grid rib 32 is not more than 4 mm, and the thickness of the upper grid rib 13 and the thickness of the lower grid rib 52 are both not less than 5 mm; more preferably, the thickness of the middle grid rib 32 is 4 mm, and the thickness of the upper grid rib 13 and the thickness of the lower grid rib 52 are both 5 mm.

As an embodiment, the upper shell 11 includes a side wall and a top wall, the upper grid rib 13 is provided with a fuel-gas through hole 14, which extends downward from the joint between the upper grid rib 13 and the top wall. By setting the fuel-gas through hole 14, it can be ensured that an upper channel is provided for fuel and a channel is provided for the flow of fuel and gas.

Specifically, the upper shell 11 and the upper grid rib 13 are injection-molded at one time. By setting that the upper shell 11 and the upper grid rib 13 are injection-molded at one time, it can be ensured that the thickness of the lower grid rib 52 is uniform, the connection strength between the upper shell 11 and the upper grid rib 13 can be improved, and the mechanical strength of the tank can be improved.

As an embodiment, before welding, the lower-end welding surface of the middle grid rib 32 and/or the upper-end welding surface of the lower grid rib 52 are/is provided with a welding material boss ring to widen the formed welding surface by hot melting. By setting a welding material boss ring on the lower-end welding surface of the middle grid rib 32 and/or the upper-end welding surface of the lower grid rib 52 before welding, the welding material boss ring is heated and melted during welding, so as to widen the formed welding surface, and further improve the welding strength between the middle grid rib 32 and the lower grid rib 52.

As an embodiment, before welding, the upper-end welding surface of the middle grid rib 32 and/or the lower-end welding surface of the upper grid rib 13 is provided with a welding material boss ring to widen the formed welding surface by hot melting. By setting the welding material boss ring on the upper-end welding surface of the middle grid rib 32 and/or the lower-end welding surface of the upper grid rib 13 before welding, the welding material boss ring is heated and melted during welding, so as to widen the formed welding surface, and to further improve the welding strength between the middle grid rib 32 and the upper grid rib 13.

Embodiment 2

As shown in FIGS. 11-16, the difference between embodiment 2 and embodiment 1 is that, as an embodiment, the bottom wall of one of the second middle grid cavities 34 sinks into the lower grid cavity to form a sinking cavity 35, the sinking cavity 35 and the second middle grid cavity 34 above the sinking cavity 35 are used to install the urea sensor 58, the bottom wall of the sinking cavity 35 is provided with a urea drain outlet, and the urea drain outlet is provided with a urea drain bolt 57. By setting that the sinking cavity 35 sinks into the lower grid cavity, not only can the required installation height be reserved for the urea sensor 58, but also the volume of the urea cavity can be increased to reserve a certain level of urea liquid in the sinking cavity 35, so as to ensure that a urea filter element is immersed in the urea liquid and prevent the urea from crystallizing at the urea filter element to block the urea filter element.

Specifically, the side wall of the sinking cavity 35 may be the lower grid rib 52, or may be integrally formed with the middle grid rib 32 by injection molding. The bottom wall of the sinking cavity 35 may be the lower shell 51, or may be integrally formed with the middle grid rib 32 by injection molding. In this embodiment, the side wall and the bottom wall of the sinking cavity 35 are integrally formed with the middle grid rib 32 by injection molding. An opening of the sinking cavity 35 is provided with an annular boss 36, and the sinking cavity 35 is connected with the side wall of the middle shell 31 and/or the middle grid rib 32 through the annular boss 36. This arrangement manner can ensure that the joint between the sinking cavity 35 and the middle shell 31 and/or the middle grid rib 32 is far away from the welded joint, and further avoid the mutual seepage of the urea liquid and the fuel from the welded joint.

Specifically, the sinking cavity 35 is located on the diagonal of the second middle grid cavity group to further ensure the uniform gravity distribution of the tank.

Specifically, the lower grid cavities include a second lower grid cavity group aligned with the second middle grid cavity group. In the second lower grid cavity group, except for a second lower grid cavity 55 corresponding to the sinking cavity 35, the other second lower grid cavities 55 all communicate with the first lower grid cavity group, so as to make the fuel circulate between the second lower grid cavities 55 and the first lower grid cavity group.

Embodiment 3

The urea tank and fuel tank assembly is formed by injection-molding the upper shell 11, the middle shell 31 and the lower shell 51 separately, and then welding the upper shell 11, the middle shell 31 and the lower shell 51 in turn. Wherein, the material of the urea tank and fuel tank assembly may be any oil-resistant material that meets the strength requirements, such as resin, specifically such as impermeable polyamide, polyethylene, polystyrene, etc.

This embodiment provides a manufacturing process for manufacturing a urea tank and fuel tank assembly, wherein the urea tank and fuel tank assembly is the urea tank and fuel tank assembly in embodiment 1. The manufacturing process includes the following steps:

(1) melting of raw materials, wherein the raw materials including nylon and polyethylene can be added with auxiliary additives, and the auxiliary additives such as compatibilizer, toughening agent and antioxidant, the compatibilizer may be grafted maleic anhydride, and the toughening agent may be POE.

(2) manufacturing of the upper shell 11, the middle shell 31 and the lower shell 51 by injection molding, wherein the injection molding adopts a high-precision servo injection molding machine, the injection pressure, injection speed and molding temperature are controlled according to the melting point of the materials, the injection pressure is in 90 Mpa, the molding temperature is greater than the melting point of the raw materials and less than 280° C., the pressure holding time is greater than 5 s, and the cooling time is greater than 30 s.

(3) welding, wherein the upper shell 11, the middle shell 31 and the lower shell 51 are connected by welding to form a shell, the welding adopts infrared welding, and the hot melting depth is not less than 0.8 mm, the welding temperature is not less than 270° C., the hot melting time is not less than 50 s, and the curing time is not less than 20 s.

The shell material selected in this embodiment can ensure that the upper shell 11, the middle shell 31 and the lower shell 51 have excellent mechanical properties, heat resistance and wear resistance, and excellent low-temperature impact resistance, so as to ensure that the product will not leak in cold areas when being collided; through the injection molding and welding process, the thicknesses of the upper shell 11, the middle shell 31, the lower shell 51, the upper grid rib 13, the middle grid rib 32 and the lower grid rib 52 are uniform, and the connection strength at the welded joint is large enough, to manufacture the upper shell 11, the middle shell 31 and the lower shell 51 with strong deformation resistance.

All embodiments in the description are described progressively, the same and similar parts between the various embodiments can be referred to each other, and each embodiment focuses on the differences from other embodiments. In particular, as far as the system embodiment is concerned, as it is substantially similar to the method embodiment, the description is relatively simple, and for related parts, please refer to the part of description of the method embodiment.

The above is merely the embodiments of the present application and is not used to limit the present application. For those skilled in the art, various modifications and changes can be made to the present application. Any modification, equivalent replacement, improvement, etc. made within the spirit and principle of the present application shall be included in the scope of the claims of the present application.

What is claimed:

1. A urea tank and fuel tank assembly, comprising:
    a shell, wherein the shell comprises an upper shell, a middle shell, and a lower shell, the upper shell, the middle shell and the lower shell are welded separately to form a cavity;
        wherein the height of the middle shell accounts for more than ⅓ of the total height of the shell;
        wherein the height ratio of the upper shell to the middle shell to the lower shell is (0.8-1.2):(4-6):(0.8-1.2);
        wherein the upper shell, the middle shell, and the lower shell are separately injection-molded and then welded by hot melting;
        wherein the middle shell is internally connected with a middle grid rib structure, the middle grid rib structure partitions the middle part of the cavity, defined by the middle shell, into several middle grid cavities;
        a first middle grid cavity group comprised in the middle grid cavities contains fuel and a second middle grid cavity group comprised in the middle grid cavities contains urea;
        the middle grid cavities form a matrix structure comprising a plurality of partitions between the first middle grid cavity group and the second middle grid cavity group;
        second middle grid cavities of the second middle grid cavity group are arranged diagonally in the matrix structure;
        the middle grid cavities do not communicate in the horizontal direction at a middle portion, and the bottom end of the first middle grid cavity group is provided with fuel passing ports to communicate with each other to form a fuel cavity; and
        a bottom end of the second middle grid cavity group is sealed and side walls of the second middle grid cavity group are provided with urea flow ports to communicate with each other to form a urea cavity.
2. The urea tank and fuel tank assembly according to claim 1, wherein the height ratio of the upper shell to the middle shell to the lower shell is 1:5:1, and the height of the upper shell and the height of the lower shell are both 50-80 mm.
3. The urea tank and fuel tank assembly according to claim 1, wherein the thickness of the upper shell is same as the thickness of the lower shell, and the thickness of the middle shell is a target thickness of the shell.
4. The urea tank and fuel tank assembly according to claim 3, wherein the thickness of the middle shell is not more than 4 mm, and the thickness of the upper shell and the thickness of the lower shell are both not less than 5 mm.
5. The urea tank and fuel tank assembly according to claim 4, wherein the thickness of the middle shell is 4 mm, and the thickness of the upper shell and the thickness of the lower shell are both 5 mm.
6. The urea tank and fuel tank assembly according to claim 1, wherein
    before welding, at least one of a lower-end welding surface of the upper shell and an upper-end welding surface of the middle shell corresponding to the lower-end welding surface of the upper shell is provided with a welding material boss ring to widen the formed welding surface by hot melting; and/or
    before welding, at least one of an upper-end welding surface of the lower shell and a lower-end welding surface of the middle shell corresponding to the upper-end welding surface of the lower shell is provided with a welding material boss ring to widen the formed welding surface.
7. The urea tank and fuel tank assembly according to claim 1, wherein the first middle grid cavity group and the second middle grid cavity group do not communicate with each other, and a urea inlet arranged on the urea cavity communicates with a urea feeding port arranged on the shell.
8. The urea tank and fuel tank assembly according to claim 7, wherein the middle shell and the middle grid rib are injection-molded at one time.
9. The urea tank and fuel tank assembly according to claim 1, wherein the lower shell is internally connected with a lower grid rib structure, and the lower grid rib structure is aligned with the middle grid rib structure to be welded;
    the lower grid rib structure partitions the lower part of the cavity into several lower grid cavities, the lower grid cavities comprise a first lower grid cavity group aligned with the first middle grid cavity group, and first middle grid cavities in the first middle grid cavity group communicate with first lower grid cavities in the first lower grid cavity group through the fuel passing ports; and
    fuel flow ports arranged on first lower grid rib between the first lower grid cavities communicate with each other, and the fuel cavity is formed by the first middle grid cavity group and the first lower grid cavity group.
10. The urea tank and fuel tank assembly according to claim 9, wherein the lower shell and the lower grid rib are injection-molded at one time.
11. The urea tank and fuel tank assembly according to claim 9, wherein the upper shell is internally connected with an upper grid rib aligned with the middle grid rib, the upper grid rib and the middle grid rib are welded, and the thickness of the upper grid rib and the thickness of the lower grid rib are both greater than the thickness of the middle grid rib.
12. The urea tank and fuel tank assembly according to claim 11, wherein the thickness of the middle grid rib is not more than 4 mm, and the thickness of the upper grid rib and the thickness of the lower grid rib are both not less than 5 mm.
13. The urea tank and fuel tank assembly according to claim 12, wherein the thickness of the middle grid rib is 4 mm, and the thickness of the upper grid rib and the thickness of the lower grid rib are both 5 mm.

* * * * *